Figure 1:
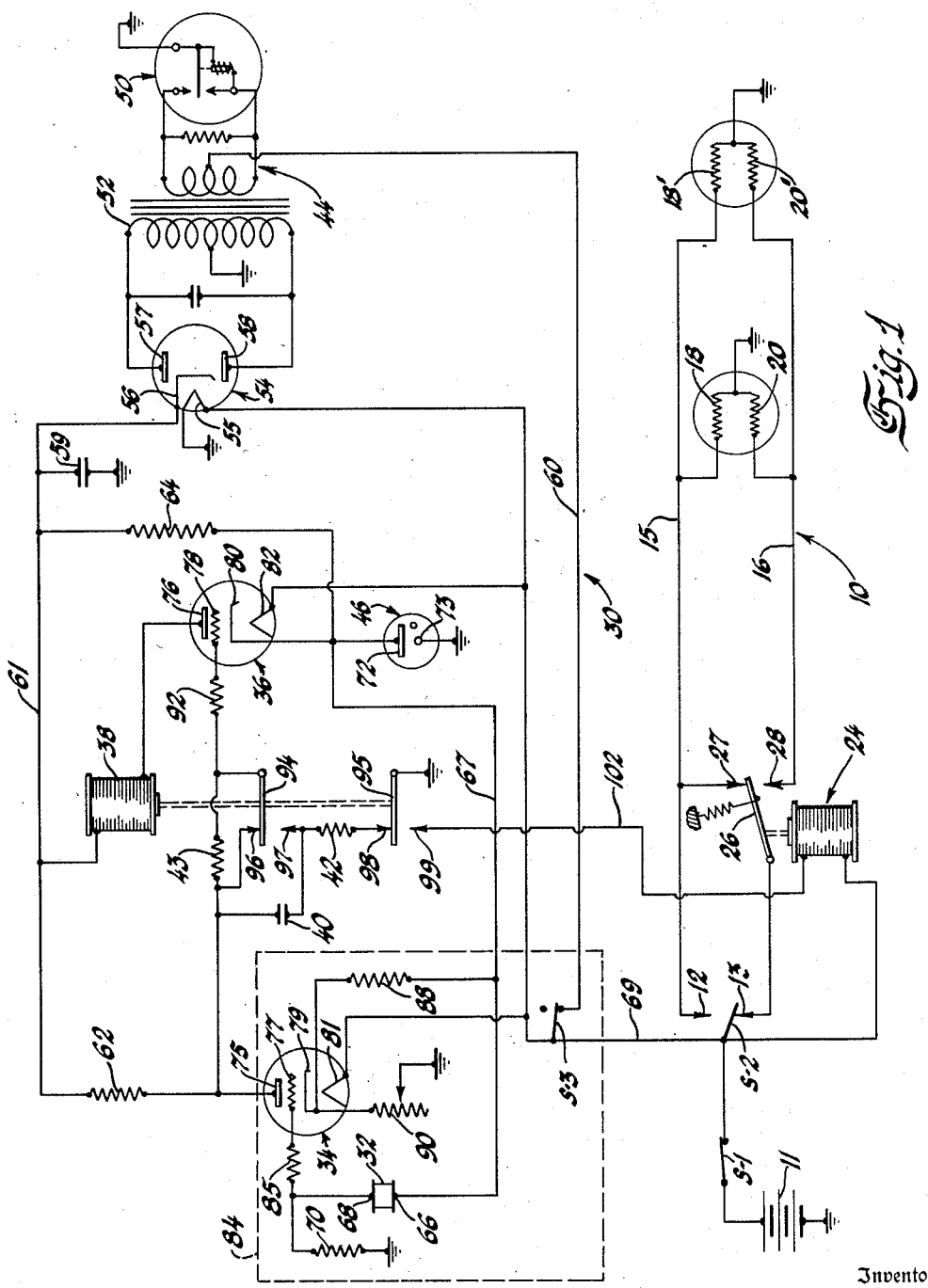

May 20, 1958 J. H. GUYTON 2,835,847
AUTOMATIC HEADLAMP DIMMER SYSTEM
Filed Oct. 13, 1951 2 Sheets-Sheet 1

Inventor
James H. Guyton
By Willits, Helwig & Baillio
Attorneys

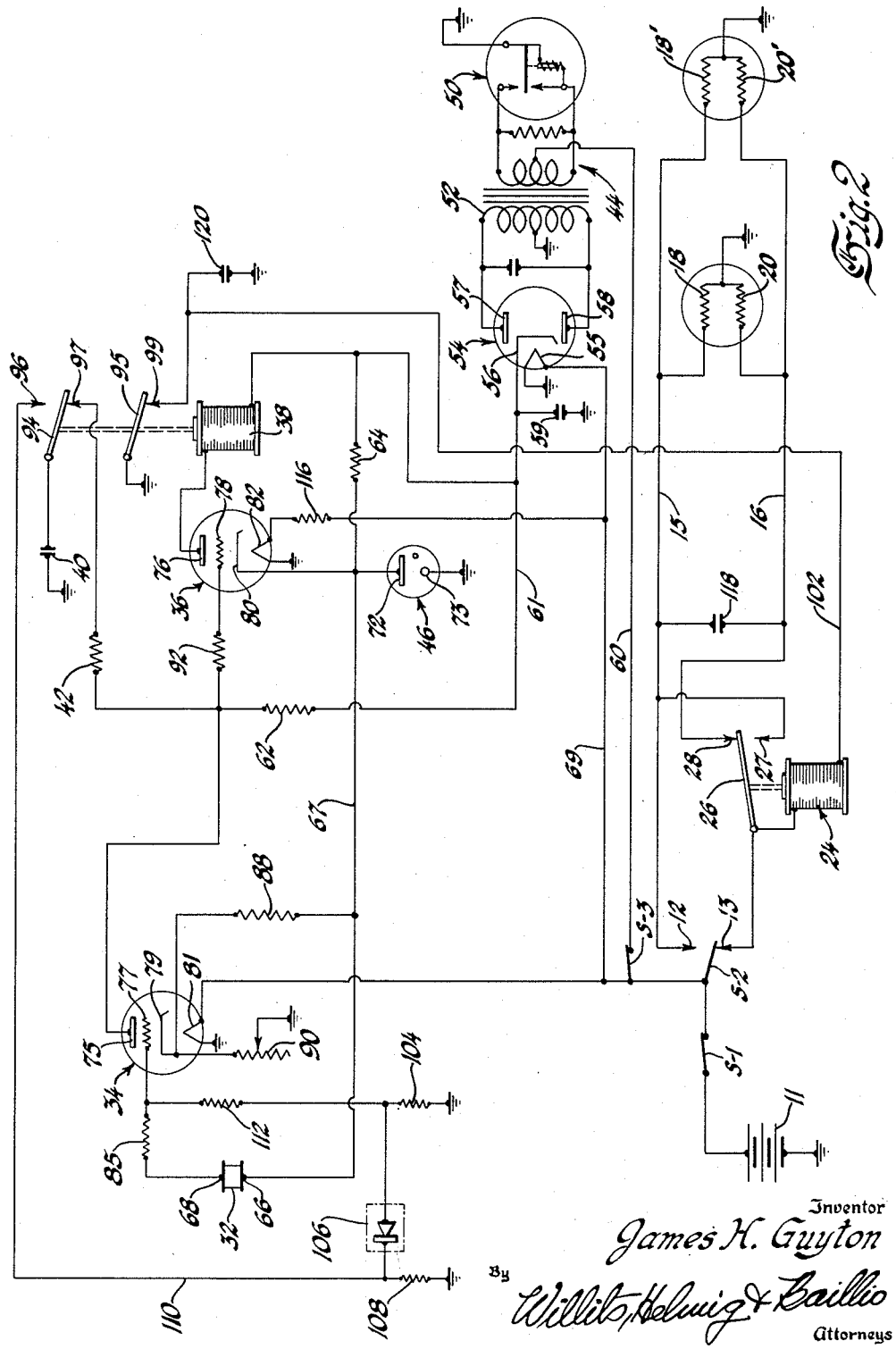

United States Patent Office 2,835,847
Patented May 20, 1958

2,835,847

AUTOMATIC HEADLAMP DIMMER SYSTEM

James H. Guyton, Kokomo, Ind., assignor to General Motors Corporation, Detroit, Mich., a corporation of Delaware Application October 13, 1951, Serial No. 251,158

11 Claims. (Cl. 315—83)

This invention relates to illumination control systems and, more particularly, to light sensitive control circuits for automatic dimming of vehicular headlamps and the like.

A well designed dimmer circuit for automotive vehicles should provide some means for maintaining the headlamps thereof in dimmed condition once they have been dimmed in response to the initially bright illumination from an approaching vehicle so as to avoid flashing by reason of the ensuing reduction of illumination from the latter vehicle when the headlamps thereof are subsequently dimmed or depressed. It has been suggested to provide such control in either of two manners; i. e., either by providing means operative even by the decreased illumination intensity level from the approaching vehicle or by providing suitable time delay means that prevents restoration to bright lights for a predetermined time interval independently of the external illumination level.

The first type of dimming system requires a circuit of superabundant sensitivity operative on different sensitivity levels as, for example, on an initially low sensitivity level when the headlamps are in normal condition on high or driving beam and on a high sensitivity level when the headlamps have been dimmed or depressed to low or passing beam. In view of their high sensitivity requirements, such systems are necessarily complex and costly from the standpoint of construction and operation.

In one type of time delay dimming system, an electronic time delay circuit, which is charged in accordance with the intensity of the illumination from the approaching vehicle, is arranged to discharge when that illumination falls below a predetermined threshold level so as to maintain the headlamps in dim condition for a definite time. In view of their lower sensitivity requirements, the dimmer systems of this class are better adapted to economical construction and operation. However, as far as applicant has been able to determine, the circuits of this class suffer from the objection that they do not permit prompt restoration of the driving beam as the vehicles pass each other.

Accordingly, the invention has for its general object the provision of a simplified dimmer control circuit of economical construction and operation with sufficient sensitivity to insure reliable operation.

Another object of the invention is to provide an improved time delay circuit in an automatic dimming system wherein the headlamps of a vehicle are restored to brighten condition substantially immediately after the incident illumination from an approaching vehicle has been removed and the vehicles have passed each other.

These and other objects, features, and advantages of the present invention will appear more fully from the following detailed description and drawings wherein:

Fig. 1 is a schematic circuit diagram of an automatic dimmer system for vehicle headlamps in accordance with the invention; and Fig. 2 is a modification of the system of Fig. 1.

Referring to the drawings, Fig. 1 illustrates a headlamp illumination circuit 10 for headlamps of the multiple filament variety, for example, the selective energization of the filaments of which is automatically controlled by an automatic dimming control circuit 30.

The headlamp circuit 10 is connected to a suitable D. C. power source 11, such as the vehicle storage battery, through the conventional headlamp switch S-1, which is usually mounted on the vehicle instrument panel, and through a series connected S. P. D. T. foot switch S-2, which is the standard beam changing switch for use by the driver, having stationary contacts 12, 13 connected in respective headlamp filament circuits 15, 16 each containing the high or driving beam filaments 18, 18' and low or passing beam filaments 20, 20', respectively, of a pair of dual filament headlamp units (not shown). Such headlamps are currently employed in automotive vehicles and are of well known construction so as not to require further description herein. The filaments of each unit are connected in respective high and low beam filament circuits in parallel with the corresponding filaments of the other units in conventional manner.

The headlamp circuit includes beam switching or selecting means in the form of a S. P. D. T. power relay 24, the armature 26 of which is shown connected in the dim or low beam filament circuit 16, for example, to selectively energize either of the circuits 15, 16 from the power source 11 through stationary relay contacts 27, 28, respectively, which are connected in the filament circuits as illustrated.

Turning now to the dimmer control circuit 30, this circuit comprises a light sensitive pick-up device 32, a light-actuated voltage amplifier 34 connected to the pick-up device, a dark-actuated power amplifier 36 directly coupled to the voltage amplifier, a D. P. D. T. sensitive relay 38 energized from the power amplifier for controlling the operation of the power relay 24, an electronic time delay circuit including a condenser 40, a charging resistor 42, and a discharging resistor 43, a power supply 44, and a voltage regulating device 46.

The power supply 44 comprises a vibrator 50, center-tapped power transformer 52, and full wave rectifier tube 54, the latter having a filament 55, a cathode 56 and a pair of anodes 57, 58. The power supply may be similar to the type ordinarily employed in automobile radio receivers except that the power transformer 52 may be somewhat smaller, since the total current drain of the control unit is only about one-third that of an auto radio. Energy is supplied to the power supply from the power source 11 through a circuit including switch S-1, switch S-3, conductor 60 and the primary side of the center-tapped power transformer 52. Suitable operating potential is supplied to the anodes of the voltage and power amplifiers 34 and 36 from the cathode 56 of the rectifier tube 54 and grounded filter condenser 59 through conductor 61 connected to the power amplifier 34 through dropping resistor 62 and through the operating coil of relay 38, respectively.

The pick-up device 32 is preferably a light responsive crystal composed of a photoconductive material such as cadmium selenide. Such crystals have 2500 times the sensitivity of ordinary high vacuum photocells and are particularly suited for use in on-off control systems of this type. Unlike the photovoltaic and photoemissive cells, the photoconductive crystal has no voltage or current output. It acts as a variable resistance with its resistance varying in accordance with the intensity of the light to which it is exposed.

Suitable operating potential is applied to the photoconductive crystal 32 from the power supply 44 through resistor 64 and the voltage regulating device 46, one terminal 66 of the crystal being connected to the high potential side of the device 46 through conductor 67, while the other terminal 68 thereof is connected to the ungrounded side of a high resistance 70 in the input circuit of the voltage amplifier 34. The voltage regulating device 46 may be a 90 volt voltage regulator VR–90 having an anode 72 and a grounded cathode 73, or a similar device having a constant voltage characteristic.

The voltage and power amplifiers 34 and 36 may be respective half sections of a type 12AT7 twin triode vacuum tube, for example, having anodes 75, 76; grids 77, 78; cathodes 79, 80; and filaments 81, 82. The voltage and power amplifiers could also be separate triode amplifiers with the voltage amplifier mounted in close proximity to the pick-up device 32 as indicated by the dotted rectangle 84 of Fig. 1 for the purpose of eliminating undesirable stray interference effects when present. The filaments 81 and 82 of the respective amplifiers are connected in parallel with the filament 55 of the rectifier tube 54 to be energized from the power source 11 through conductor 69 as shown.

When the pick-up device 32 is exposed to external illumination, the voltage across resistor 70 increases and is transferred to the grid 77 of amplifier 34 through grid resistor 85. Voltage amplifier 34 conducts sufficient plate current to provide a voltage at anode 75 about 5 volts above the cathode 80 of tube 36 when there is no illumination incident on the crystal pick-up device 32. The amplifier 34 is normally biased to this condition by application of a positive potential to the cathode 79 thereof through bleeder resistor 83 which in combination with the series connected cathode resistor 90 forms a potential divider circuit connected across the voltage regulating device 46 as shown.

The anode 75 of voltage amplifier 34 is connected through a discharge resistor 43 of high ohmic value and grid resistor 92 to the grid 78 of the power amplifier 36, the cathode 80 of which is connected to the anode 72 of the voltage regulator 46. The anode 76 of the power amplifier 36 operates at a higher potential than the anode 75 of the voltage amplifier 34 and the cathode 80 of amplifier 36 at a higher potential than the cathode 79 of amplifier 34 in the fashion of D. C. amplifiers. The voltage regulator device 46 has the effect of stabilizing the cathode potential of the power amplifier and the operating potential supplied to the photoconductive crystal 32.

Power amplifier 36 is normally conducting or dark-actuated in the absence of external illumination below a predetermined threshold value on the crystal pick-up 32 and energizes the sensitive relay 38 connected in the output circuit thereof. Relay 38 is adapted to operate on a current of a few milliamperes and is of the D. P. D. T. variety having a pair of armatures 94, 95 each of which is associated with a separate pair of stationary contacts 96, 97 and 98, 99, respectively.

The system further comprises a condenser time delay circuit which is adapted to be inserted in the input circuit of either of the amplifiers 34 or 36 so as to supply a biasing potential thereto of proper polarity to maintain the headlamps in dimmed condition once the bright headlamps have been switched to dim condition in response to the illumination from an approaching vehicle. The condenser 40 is connected to the anode 75 of the voltage amplifier 34 to be charged from the output thereof through a circuit completed to ground through resistor 42 and stationary contact 98 and armature 95 of relay 38 when the latter is energized. Under these conditions resistor 43, which is of high ohmic value, will be shorted out of the grid circuit of the power amplifier by stationary contact 96 and armature 94 of relay 38.

Turning now to the operation of Fig. 1, the dimmer circuit 30 is placed in operating condition when switch S–1 is closed, switch S–2 in the position shown and switch S–3 closed to energize the power supply 44 of the dimmer circuit from the power source 11. In the absence of illumination on the pick-up device 32, the voltage amplifier 34 is direct coupled to the power amplifier 36 and maintains amplifier 36 in conducting condition by virtue of the comparatively high anode potential of amplifier 34. Relay 38 is energized and the armatures 94, 95 thereof drawn into energized position as shown, whereby resistor 43 is shorted, condenser 40 connected to charge through resistor 42 and resistor 62, and power relay 24 is de-energized.

When the approaching vehicle reaches a point at which it produces sufficient illumination on the pick-up device 32 to reduce the bias on the voltage amplifier 34, that tube conducts more anode current and its anode potential is thus decreased. This lowers the potential on the grid 78 of tube 36 and decreases or cuts off the current flow therein to a point where the sensitive relay 38 becomes de-energized and the armatures 94, 95 thereof drop into the opposite position shown. The power relay 24 is now energized from the D. c. power source 11 through a circuit completed through conductor 102, contact 99 and armature 95 of relay 38 and switches the headlamps from bright to dim condition by de-energizing the bright filament circuit 15 and completing the dim or low beam filament circuit 16 through armature 26 and contact 28 of relay 24.

With relay 38 de-energized, condenser 40, which has been fully charged while connected in shunt with the input circuit of amplifier 36, is inserted in series between the anode 75 of amplifier 34 and the grid 78 of amplifier 36 which is now essentially A. C. coupled to amplifier 34. The condenser 40 discharges through resistor 43 which is no longer shorted and applies a negative biasing potential to the grid 78 of the amplifier 36 sufficient to maintain the relay 38 in a de-energized condition for a definite time interval during which the control circuit is paralyzed and maintained insensitive to changes in incident illumination.

As a precautionary measure in case of failure of the dimmer circuit, manual control over the selection of the headlamp illumination is provided when the headlamps have been switched to dim position by virtue of the overriding action of the foot switch S–2.

As the cars pass, the anode voltage of the voltage amplifier 34 rises abruptly due to the loss of illumination on the pick-up device 32 and the voltage amplifier returns to its normal condition. The increase in anode voltage of amplifier 34 is transferred to the grid 78 of amplifier 36 by condenser 40 so as to return the power amplifier to its normal conducting condition, whereby relay 38 is re-energized by the increase in anode current of amplifier 36. The control unit is thus returned to its initial condition and automatically switches the lights to brightened condition with condenser 40 again connected to be charged through resistor 42 and resistor 62.

The time constant of the discharge circuit is so chosen as to return the control circuit to normal sensitivity preferably before the vehicles have passed. The control circuit is then controlled in accordance with the intensity of the incident illumination on the photoconductive cell. The approaching vehicle will then be so close that the illumination therefrom usually will be sufficient to maintain the power amplifier in nonconducting condition and will operate to restore the headlamps to brightened condition promptly at the time the vehicles pass. Viewed in terms of sensitivity to incident light, the control circuit of the present invention may be thought of as being initially responsive to a predetermined threshold value of incident light which, when exceeded, temporarily reduces the threshold of sensitivity of the system to incident light to a lower or zero threshold value and then returns to normal sensitivity where the system is responsive to incident light above the predetermined threshold value.

The headlamp switch position is at first a function of elapsed time as the time constant circuit discharges. The dimmer circuit is then controlled in accordance with the external illumination level only and will return the headlamps substantially immediately to brightened condition when the external illumination is removed. A time constant in the neighborhood of from about three to six seconds has been found to permit reliable operation under substantially all driving conditions.

Even though the condenser 40 has not fully discharged, most, if not all, of the discharge time constant will be consumed when the headlights of the approaching vehicle are passed, and full road illumination will be restored by switching to bright lights in a very quick time that is appreciably shorter than the restoration interval of dimming circuits in which the bright headlamps are restored a predetermined time after the external illumination is removed.

Fig. 2 is a modification of Fig. 1 differing principally therefrom in the discharge path of the time delay circuit. Similar reference notations have been employed to identify the circuit elements common to both figures. Power relay 24 is connected to be energized only when the dimmer circuit is energized and is connected in circuit with the D. C. power source 11 through switches S–1 and S–2, conductor 102, stationary relay contact 99 and the pole 95 of relay 38. Discharge resistor 43 has been removed from the grid circuit of the power amplifier for the purpose of increasing the plate current thereof. Charging resistor 42 connected to the plate 75 of amplifier 34 is adapted to be selectively inserted in circuit with condenser 40 through stationary contact 97 and pole 94 of relay 38. The condenser 40 now discharges through a parallel circuit, one branch of which includes a grounded resistor 104 connected in series with a unidirectional conducting element 106 while the other branch includes a grounded resistor 108. The discharge circuit is completed to the ungrounded side of condenser 40 through conductor 110, stationary contact 96 and pole 94 of relay 38. The high potential side of resistor 104 is also connected to one side of a high resistance 112, the opposite side of which is directly connected to the grid 77 of the voltage amplifier 34. The pick-up device 32 is connected to the grid of the voltage amplifier through grid resistor 85 and to the high potential side 72 of the voltage regulator device 46 through conductor 67. A resistor 116 of low ohmic value has been included in series with the filament 82 of the power amplifier 36 to allow the filament 81 of the voltage amplifier 34 to heat more rapidly and insure proper control over the power amplifier by the voltage amplifier. Condensers 118 and 120 have been inserted as shown to prevent arcing of the relay contacts with which they are associated.

With the dimmer circuit energized and in the absence of external illumination on the crystal pick-up device 32, the power amplifier 36 is conducting and relay 38 energized with its poles 94, 95 in the position shown. Condenser 40 is connected through stationary relay contact 97 to be charged from the output of the voltage amplifier 34 through resistor 42. Application of illumination above the threshold level from an approaching vehicle on the pick up device 32 reduces the negative bias on the voltage amplifier 34 and increases the anode current thereof. This reduces the anode potential of amplifier 34 and therefore the potential applied to the grid 78 of power amplifier 36 and lowers the conductivity of the latter so as to de-energize relay 38 which switches the headlamps to dim condition by interrupting the current through the power relay 24. Condenser 40 is then connected to discharge through resistor 108 and resistor 104 connected in parallel with resistor 108 through the unidirection conducting element 106 as shown. The element 106 may be a type N6–S. C. A. selenium diode, for example, or any other device having a uni-directional conduction characteristic.

The discharge circuit of Fig. 2 is connected to supply a positive potential to the grid circuit of the voltage amplifier 34 through resistor 112 of high ohmic value to maintain the amplifier 34 in conducting condition. The control circuit holds the headlamps on dim position until the condenser discharge falls below a predetermined level where the crystal output determines whether the headlamps remain on dim or are to be switched back to bright condition. The selenium diode 106 blocks the crystal output from charging the condenser 40 from voltage produced between grid 77 and ground by the illumination of the approaching vehicle.

Of further interest is a search feature which is incorporated in the time constant circuits of both Figs. 1 and 2. The effective sensitivity of the control circuit is momentarily increased during the interval of switching from dim back to bright headlamps. This allows the dimmer circuit to scan the road when an approaching vehicle has passed and to maintain the headlamps in dim condition if another vehicle is approaching. The control circuit dims in the usual manner and returns to normal sensitivity after the time constant interval. If the illumination is only slightly less than that required to hold the headlamps in dim condition, the sensitive relay 38 switches to bright position and then immediately returns to dim. The time required for this search operation is so short that flashing of the approaching vehicle does not usually occur because the power relay 24 does not have time to operate.

The above is accomplished by charging the time constant condenser 40 from the anode of the voltage amplifier 34 when the sensitive relay 38 returns to the bright position. The surge of current into condenser 40 momentarily reduces the anode voltage of amplifier 34 which will cut off amplifier 36 and return the sensitive relay to dim position, the circuit thus being slightly regenerative. This action is sufficient to cause the return to dim if there is already appreciable illumination incident on the pickup unit from approaching cars.

The momentary sensitivity increase is controlled by the value of charging resistor 42, a low value of resistance leading to an excessive regenerative condition. Since it is desired to charge condenser 40 as rapidly as possible in order to be ready for the next cycle of operation, the resistance of charging resistor 42 should preferably be less than the resistance of the discharge circuit. By properly proportioning resistor 42 the momentary sensitivity of the control circuit can be sufficiently increased without unduly increasing the charging time for condenser 40. Usually a value for resistor 42 approximately one-tenth the resistance of the discharge circuit will suffice for these purposes.

Although one form of time delay means has been described in the illustrated embodiment of the invention, the time delay may be provided by a thermally responsive switch, a resetting clock or other time delay devices which function to switch bias for a short predetermined interval.

It is to be understood that the above described arrangements are illustrative of the application of the principles of the invention and that other arrangements may be devised by those skilled in the art without departing from the spirit and scope of the invention.

I claim:

1. A headlight dimmer system for vehicles comprising, in combination, a headlight operable in a normal condition and in a passing condition, a light sensitive pick-up device responsive to incident illumination, vacuum tube signal amplifying means controlled by said pick-up device, control means actuated by said amplifying means in response to incident illumination on said pick-up device above a predetermined threshold value and changing said headlight from normal to passing condition, and means actuated by said amplifying means concurrently with said control means and lowering the threshold of sensitivity of said system to incident light for a predetermined time interval, said means including time delay biasing means connected in circuit with said amplifying means only when said headlight has been changed by said control means from normal to passing condition.

2. A headlight dimmer system for vehicles comprising, in combination a headlight operable in a normal condition and in a passing condition, a light sensitive pick-up device responsive to incident illumination, signal amplifying means controlled by said pick-up device, control means actuated by said amplifying means in response to incident illumination on said pick-up device above a predetermined threshold value and changing said headlight from normal to passing condition, means actuated by said amplifying means concurrently with the actuation of said control means and lowering the threshold of sensitivity of said system to incident light for a predetermined time interval, said means including a condenser connected to said amplifying means and charged when said incident illumination is below said predetermined threshold value, and means connecting said condenser in a discharge circuit to bias said amplifying means when said incident illumination rises above said threshold value.

3. An automatic dimmer control circuit for vehicle headlamps equipped with driving and passing beams, said circuit comprising, in combination, a light-sensitive pick-up device responsive to incident illumination, signal amplifying means controlled by said pick-up device, control means actuated by said amplifying means in response to incident illumination on said pick-up device above a predetermined threshold value for changing from one of said headlamp beams to the other, means actuated by said amplifying means concurrently with said control means and maintaining said amplifying means insensitive to changes in said incident illumination for a predetermined time interval when said incident illumination rises above said predetermined threshold value and increasing momentarily the sensitivity of said system when said incident illumination falls below said threshold value after said system has been returned to normal sensitivity upon the expiration of said time interval, said means including a condenser connected to said amplifying means and charged when said incident illumination is below said predetermined threshold value, and means connecting said condenser in a discharge circuit to bias said amplifying means.

4. A headlight dimmer system for vehicles comprising, in combination, a headlight operable in a normal condition and in a passing condition, a light sensitive pick-up device responsive to incident illumination, signal amplifying means controlled by said pick-up device, said amplifying means including first and second amplifiers each having input and output circuits, control means actuated by said amplifying means in response to incident illumination on said pick-up device above a predetermined threshold value to change said headlight from normal to passing condition, and means actuated by said amplifying means concurrently with the actuation of said control means and lowering the normal threshold of sensitivity of said system to incident light for a predetermined time interval when said incident illumination rises above said predetermined threshold value and increasing momentarily the sensitivity of said system when said incident illumination falls below said threshold value after said system has been returned to normal sensitivity upon the expiration of said time interval, said means including a condenser connected to the output of said first amplifier and charged when said incident illumination is below said predetermined threshold value and means for connecting said condenser in a discharge circuit connected to the input of one of said amplifiers to supply a biasing potential thereto.

5. A dimmer circuit for automatically dimming vehicle headlamps equipped with driving and passing beams, said circuit comprising, in combination, a light sensitive pick-up device responsive to incident illumination, signal amplifying means including first and second amplifiers each having input and output circuits, the input of said first amplifier being connected in circuit with said pick-up device and its output coupled to the input of said second amplifier, relay means energized from said second amplifier, switching means controlled by said relay means automatically switching from one of said headlamp beams to the other, means maintaining said amplifying means insensitive to changes in incident illumination for a predetermined time interval when said incident illumination rises above a predetermined threshold value, said means including a condenser connected to said first amplifier and charged when said incident illumination is below said threshold value and means connecting said condenser in a discharge circuit to bias said second amplifier.

6. A dimmer circuit for automatically dimming vehicle headlamps equipped with driving and passing beams, said circuit comprising, in combination, a light sensitive pick-up device responsive to incident illumination, signal amplifying means including a first amplifier controlled by said pick-up device and a second amplifier having an input circuit controlled by said first amplifier, said second amplifier being direct coupled to said first amplifier when said incident illumination is below a predetermined threshold value, relay means connected to said second amplifier, switching means controlled by said relay means automatically switching from one of said headlamp beams to the other, means maintaining said amplifying means insensitive to changes in incident illumination for a predetermined time interval when said incident illumination rises above said predetermined threshold value, said means including a condenser in shunt with the input circuit of said second amplifier when said incident illumination is below said threshold value and means connecting said condenser in a discharge circuit in series with the input of said second amplifier when said incident illumination rises above said threshold value.

7. A dimmer circuit for automatically dimming vehicle headlamps equipped with driving and passing beams, said circuit comprising, in combination, a light sensitive pick-up device responsive to incident illumination, signal amplifying means including a light actuated amplifier controlled by said pick-up device, a dark-actuated amplifier conducting in the absence of illumination on the light sensitive pickup device and controlled by said light-actuated amplifier, relay means energized from said amplifying means when said incident illumination is below a predetermined threshold value, headlamp beam switching means controlled by said relay means, and means maintaining said amplifying means insensitive to changes in incident illumination above a predetermined threshold value for a predetermined time interval, said means including a condenser connected to said light actuated amplifier and charged when said incident illumination is below said threshold value and means connecting said condenser in a discharge circuit biasing one of said amplifiers when said incident illumination rises above said threshold value.

8. A dimmer circuit for automatically dimming vehicle headlamps equipped with driving and passing beams, said circuit comprising, in combination, a photoconductive pick-up device responsive to incident illumination, signal amplifying means including a light-actuated amplifier controlled by said pick-up device, a dark-actuated amplifier conducting in the absence of illumination on the light sensitive pick-up device and controlled by said light actuated amplifier, relay means energized from said amplifying means when said incident illumination is below a predetermined threshold value, headlamp beam switching means controlled by said relay means, and means maintaining said amplifying means insensitive to changes in incident illumination above a predetermined threshold value for a predetermined time interval, said means including a condenser connected to said light actuated amplifier and charged when said incident illumination is below said threshold value and means connecting said condenser in a discharge circuit biasing said dark-actuated amplifier when said incident illumination rises above said threshold value.

9. An automatic dimmer control circuit for vehicle headlamps equipped with driving beams and passing beams, said circuit comprising, in combination, a light-sensitive pick-up device responsive to incident illumination, vacuum tube signal amplifying means controlled by said pick-up device, relay control means actuated by said amplifying means in response to incident illumination on said pick-up device above a predetermined threshold value and changing from one of said headlamp beams to the other, means actuated by said amplifying means concurrently with the actuation of said relay control means and maintaining said amplifying means insensitive to changes in incident illumination for a predetermined time interval when said incident illumination rises above said predetermined level, said means including reactive impedance means connected to and energized from said amplifying means when said incident illumination is below said predetermined said threshold value and means connecting said reactive impedance means in a discharge circuit biasing said amplifying means when the incident illumination rises above said threshold value.

10. A headlight dimmer system for vehicles comprising, in combination, a headlight operable in a normal condition and in a passing condition, a photoconductive light sensitive pickup device, vacuum tube signal amplifying means controlled by said pickup device, control means actuated by said signal amplifying means in response to incident illumination on said pickup device above a predetermined threshold value and changing said headlights from normal condition to passing condition, and means actuated by said amplifying means concurrently with said control means and lowering the threshold of sensitivity of said system to incident light above said predetermined threshold value, said last named means including biasing means connected in circuit in biasing relation with said signal amplifying means only when said headlight has been changed by said control means from normal to passing condition, said pickup device being a photoconductive crystal and power supply means supplying operating voltage to said amplifying means and said light sensitive pickup device.

11. A headlight dimmer system for vehicles comprising, in combination, a headlight operable in a normal condition and in a passing condition, a photoconductive light sensitive pickup device, vacuum tube signal amplifying means controlled by said pickup device, control means actuated by said signal amplifying means in response to incident illumination on said pickup device above a predetermined threshold value and changing said headlights from normal condition to passing condition, and means actuated by said amplifying means concurrently with said control means and lowering the threshold of sensitivity of said system to incident light for a predetermined interval, said last named means including time delay biasing means connected in circuit in biasing relation with said signal amplifying means only when said headlight has been changed by said control means from normal to passing condition, said pickup device being a photoconductive crystal such as cadmium selenide.

References Cited in the file of this patent

UNITED STATES PATENTS

| | | |
|---|---|---|
| 2,380,486 | Willis | July 31, 1945 |
| 2,406,139 | Fink et al. | Aug. 20, 1946 |
| 2,476,389 | Schmidt | July 19, 1949 |
| 2,504,628 | Benzer | Apr. 18, 1950 |
| 2,560,748 | Silva | July 17, 1951 |